Figure 7:
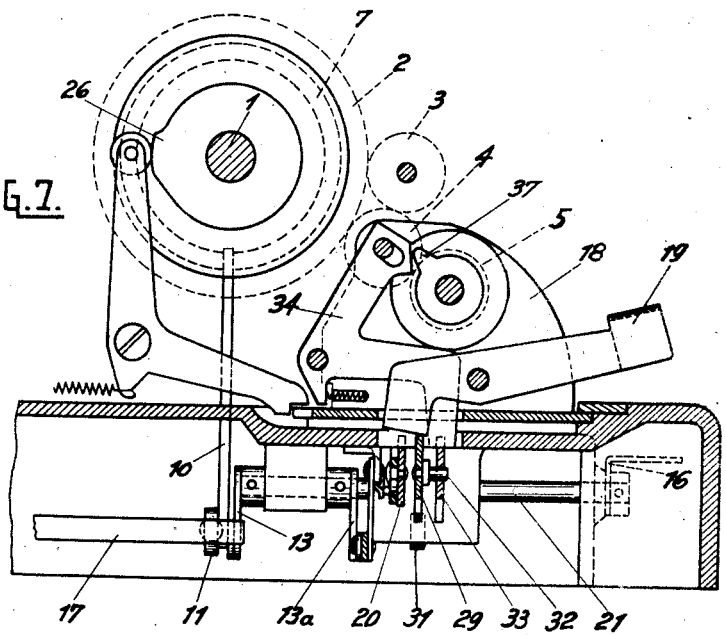

May 30, 1933.  C. HAMANN  1,912,133
MOTOR DRIVEN COMPUTING MACHINE
Filed Jan. 23, 1926   4 Sheets-Sheet 1
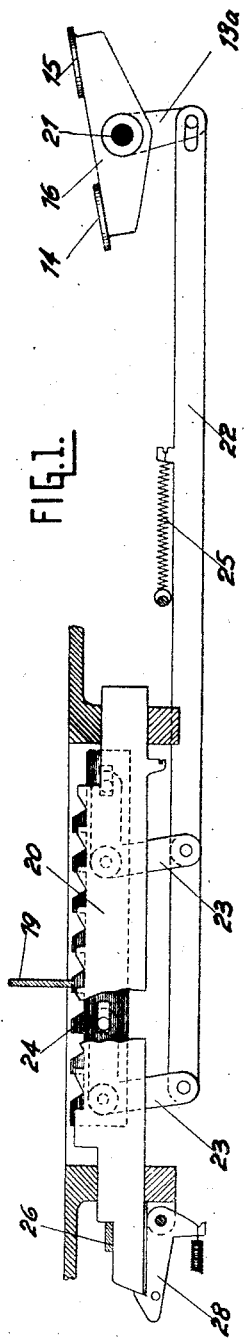
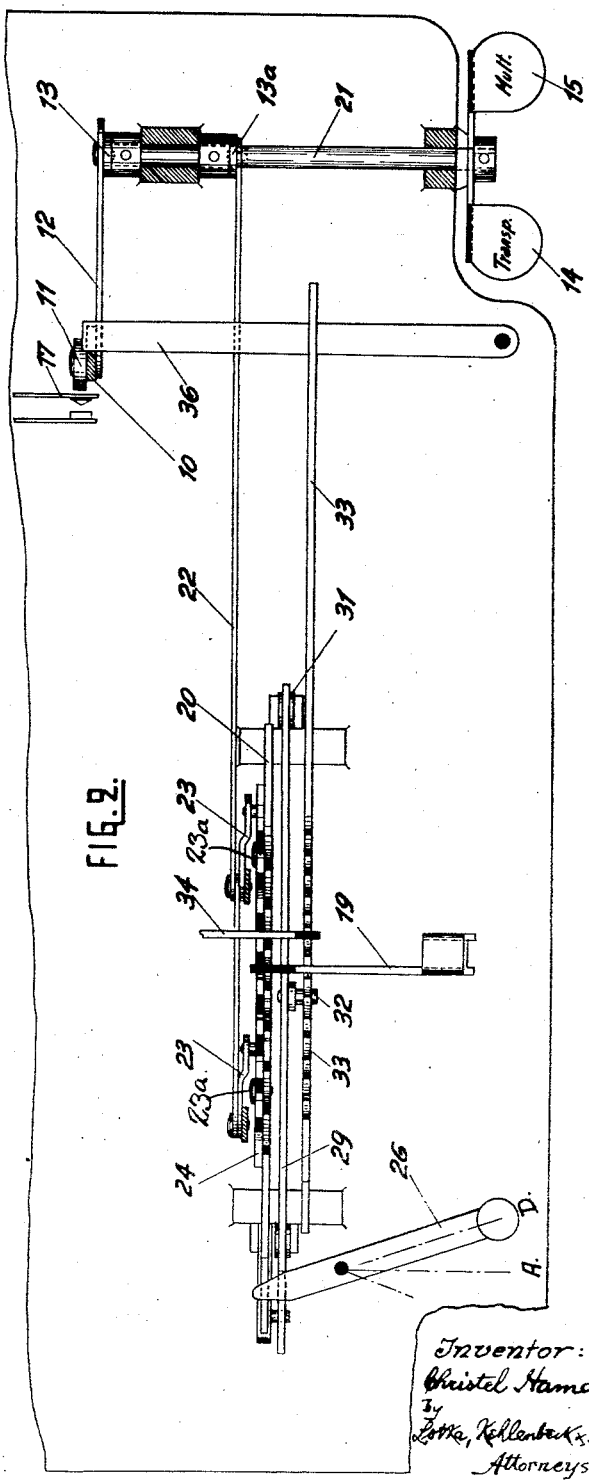
Inventor:
Christel Hamann
by
Lotka, Kellenbach & Fack
Attorneys.

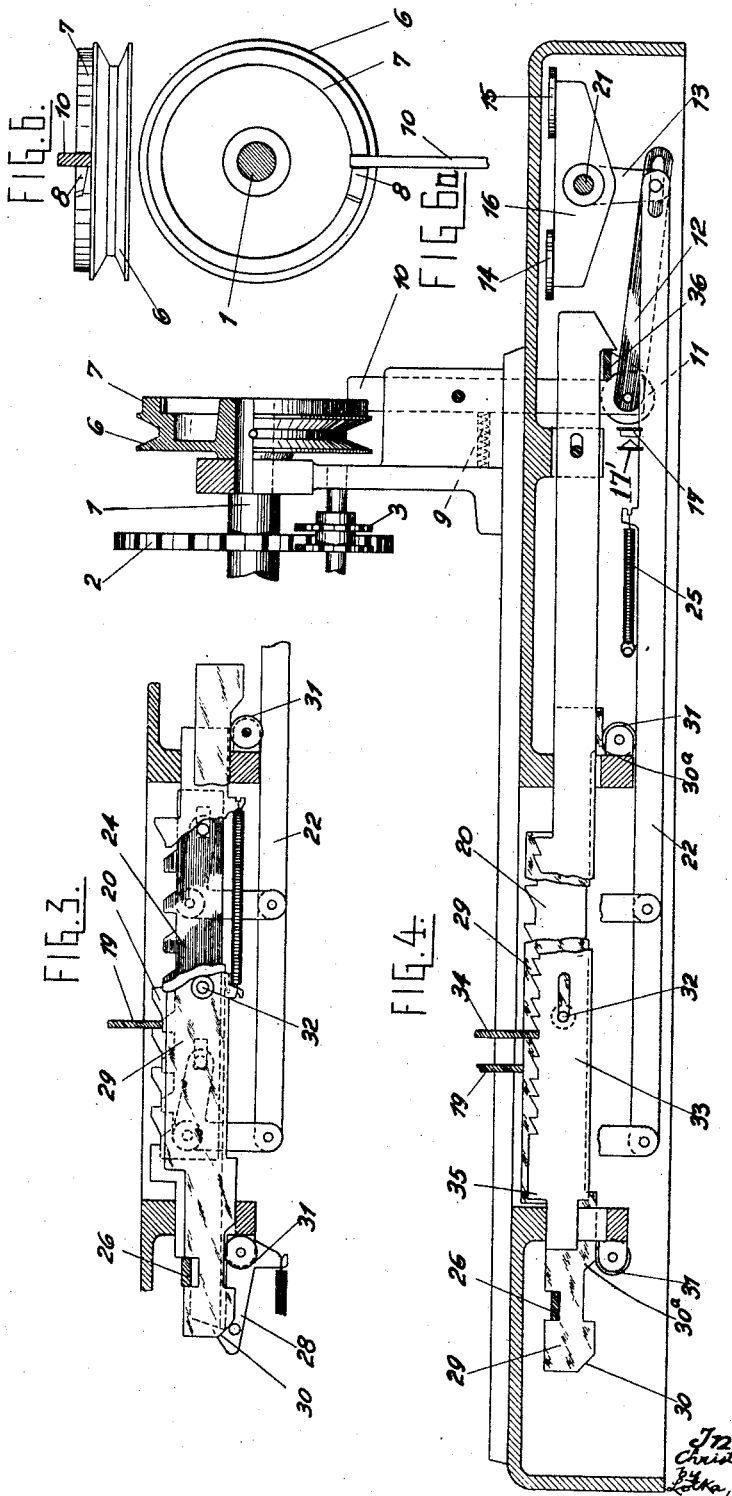

May 30, 1933.　　　　C. HAMANN　　　　1,912,133
MOTOR DRIVEN COMPUTING MACHINE
Filed Jan. 23, 1926　　　4 Sheets-Sheet 3
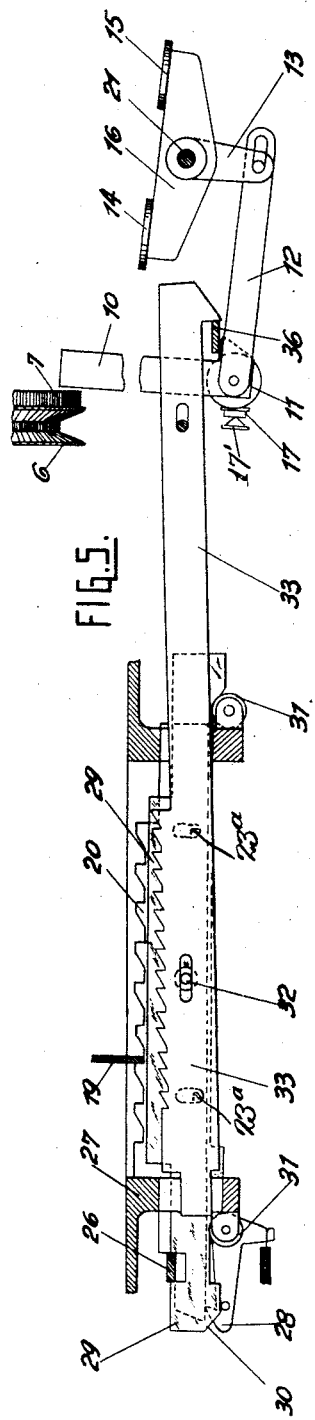
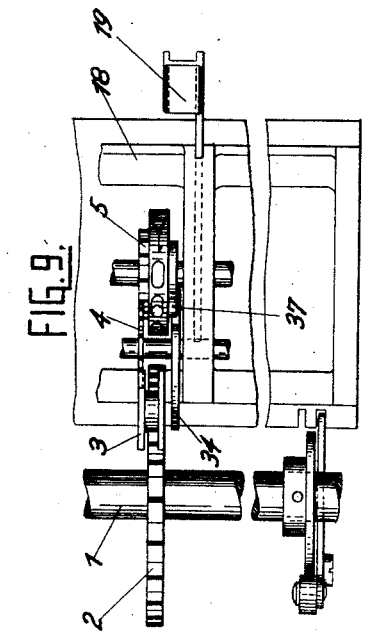
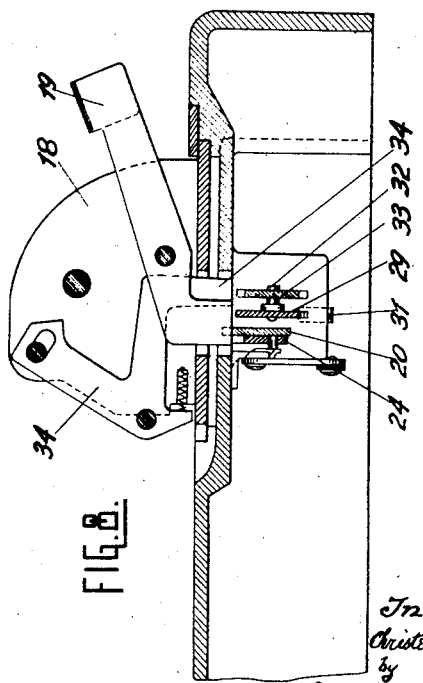
Inventor:
Christel Hamann
by
Locke, Kellenbeck & Farley
Attorneys.

May 30, 1933. C. HAMANN 1,912,133
MOTOR DRIVEN COMPUTING MACHINE
Filed Jan. 23, 1926  4 Sheets-Sheet 4

Inventor:
Christel Hamann
by
Lotka, Kehlenbeck & Farley
Attorneys.

Patented May 30, 1933

1,912,133

UNITED STATES PATENT OFFICE

CHRISTEL HAMANN, OF NEU-BABELSBERG NEAR BERLIN, GERMANY, ASSIGNOR TO DEUTSCHE TELEPHONWERKE UND KABELINDUSTRIE AKTIENGESELLSCHAFT, OF BERLIN, GERMANY

MOTOR DRIVEN COMPUTING MACHINE

Application filed January 23, 1926, Serial No. 83,218, and in Germany January 28, 1925.

There are known computing machines in which the machine is imparted one or more movements by a key being pressed down for a period more or less extended while the driving electromotor is either continuously running and a clutch between the same and the machine is periodically put in, or while the motor is as a rule stopped and only periodically running when a key is operated.

My present invention refers to a computing machine which also optionally makes one revolution for addition and subtraction and one or more revolutions for multiplication, the switching in of a motor being operated by hand for any space of time, whereas for division the circuit of the motor is closed by the totalizer which alternately assumes the subtraction and addition positions.

My invention essentially consists in a rocking lever, provided with one pair of keys, on the one hand releasing a shifting-mechanism lock and at the same time making contact for starting the motor and on the other hand shifting the totalizer from one decade to another, so that according to the position of said lever either only the drive of the machine or only the setting of the totalizer is accomplished.

The drawings show an example of execution of my new computing machine viz.: Fig. 1 is a side-view showing the shifting mechanism in one of the positions it assumes during multiplication. Fig. 2 is the same shifting mechanism as seen from above. Fig. 3 is a side view of the same shifting mechanism in its subtracting position. Fig. 4 shows the body of the machine in a longitudinal section with the driving and shifting elements and with the shifting mechanism of the totalizer in the dividing position. Fig. 5 shows the shifting mechanism of the totalizer in its adding position. Fig. 6 is an edge view showing the adding disc with its locking member. Fig. 6a is a face view of said disc. Fig. 7 is a cross-section of the machine. Fig. 8 shows some shifting, totalizing and locking members in a certain working position seen laterally. Fig. 9 shows the same members as seen from above.

The shaft 1 extending transversely of the machine (Figs. 4, 7, 9) carries shifting members which essentially consist of gears 2 meshing with intermediate pinions 3. These latter drive the totalizer gears 4 and 5 (Figs. 7, 9) in such manner, that the latter during addition are rotated in one direction and during subtraction in the opposite direction. On the journal of shaft 1 is mounted the groove-wheel 6 (Fig. 4) around which is wound the driving element connected with the motor (cord, belt, spring, chain or the like). Groove wheel 6 has a drumlike ring 7 (Figs. 4, 6) with a recess 8 into which, for securing the neutral position of ring 7, a latch 10 is pressed (Fig. 5) by means of the spring 9. At its lower end latch 10 is provided with an insulating roller 11 (Fig. 4) and a link 12 the right-hand end of which is attached to the arm 13 of a rocking member 16 carrying the keys 14 and 15. The key 15 marked with "Mult" being pressed down the latch 10 comes out of engagement with recess 8. At the same time the insulating roller 11 presses the contact spring 17 against the companion spring 17' whereby the circuit of the motor is closed. The revolution of the shifting mechanism thus started continues until latch 10 enters again into recess 8 and contact between 17 and 17' is thereby broken. This contact is on the contrary maintained by the latch during the whole revolution as long as the latch rests upon the ring 7. Recess 8 is however so proportioned that the circuit is interrupted at 17, 17' before the latch stops the groove wheel 6. In this way only the inertia of the shifting mechanism is to be met with at the end of the revolution which effect is almost completely absorbed by the friction of the several shifting members.

When the machine is to make several revolutions for multiplication, key 15 is pressed down until the shifting mechanism has performed the necessary number of turns. This is checked either acoustically by the rhythmic working noise or optically by a revolution counter of any customary or approved type.

Key 14 is intended for bringing the totalizer 18, the so called slide (Figs. 7, 8), into the different decade positions. The slide is provided with a pawl 19 (Figs. 2 to 5) which engages with the rack 20 fastened to the machine body in order to hold the slide 18 in the different working positions, slide 18 being under the influence of a spring tending to move it lengthwise. Key 14 being pressed down, arm 13a mounted on the same shaft 21 as arm 13 is made to pull the rod 22 to the right—as seen on the drawings—whereby the angular levers 23 (Figs. 1, 2) lift the releasing bar 24 parallel with the horizontal.

As the said bar 24 is thus raised the latch 19 is lifted by the crown of one of the teeth of said releasing bar 24 as illustrated in Figs. 1 and 3. This result is attained by properly setting the rack 20 which is connected with the bar 24 by two pins 23a slidable in vertical slots as shown in Fig. 5; with this arrangement the bar 24 is capable of being elevated relatively to the rack 20, by depression of the key 14, but is incapable of independent movement in a lengthwise direction. In this position the slide is temporarily stopped. When key 14 is released the releasing bar 24 is lowered into its neutral position under the influence of spring 25, and latch 19 is made to bear against the next tooth of rack 20 so that the slide enters into another decade. The aforesaid lifting of the bar 24 takes place only momentarily so that the latch 19 raised thereby therefore drops into the next tooth gap of the rack 20.

In order to accomplish a subtraction the control lever 26 (Figs. 2–4) is moved to the left. Thereby the rack 20 is moved in a lengthwise direction to the right. By this adjustment to the right, the rack 20 is set in that position, in which its teeth, at each step, hold the slide 18 in such an adjustment, that the intermediate pinion 3 (Fig. 9) drives the totalizer gears 4, 5 of the number wheels 37 in subtraction direction during the operation of the machine. The rack ordinarily bears against a stop at 27 (Fig. 5) and is displaced to the right by lever 26. In this new position it is held by means of hook 28 (Figs. 1, 3) against the action of the slide spring.

The control lever 26 also engages with a recess of a bar 29. This bar is provided at its left hand end with a slope 30 with which it slides over a pin of hook 28 when the lever 26 is shifted from subtraction to addition thus throwing said hook 28 outwardly.

As above set forth and as shown in Figs. 4 and 5 the keys 14 and 15 are located upon the opposite ends of the rocking element 16 pivotally movable about the axis 21. This construction, the operation of which has previously been clearly set forth, has the purpose that momentarily either only the driving motor is cut in by means of the contact spring 17 or the slide 18 is shifted. For this reason the openings at the right hand ends of the bars 12 and 22, into which the lug at the lower end of the arm 13 of the rocking element 16 extends, are in the form of elongated slots. When the rocking element 16 is in the intermediate position shown in Fig. 4 neither the driving motor is cut in, nor is the slide 18 shifted. If the key 15 is depressed, as shown in Fig. 5, only the bar 12 is moved toward the left, while if the key 14 is correspondingly depressed, only the bar 22 will be shifted toward the right.

Division is accomplished entirely automatically after the divisor has been set at the left in the feeding device, the dividend at the left in the carriage, and the latter has been pulled out entirely to the right. This method of division, as such, is known and is described for instance in British Patent #166,486 of 1921. Thereby, in each position of the carriage a subtraction of the divisor takes place until the last number wheel has been set from 0 to 9. At this stage the divisor has been subtracted once in excess, and a correction follows consisting of a single addition of the divisor. In order to start division control lever 26 is brought into position D (Fig. 2). As this is done bar 29 is raised parallelly by the right hand and left hand slopes 30a of the same (Fig. 4) sliding over fixed rollers 31. As bar 29 is raised it covers the teeth of rack 20 and makes latch 19 ineffective. As bar 29 is raised rack 33 is lifted by means of pin 32 (Figs. 2 to 4), and a latch 34 (Figs. 4, 7), spring mounted in slide 18 like latch 19, engages with the teeth or bar 33. When slide 18 is displaced entirely to the right and then released, so that it may follow the traction of its spring in a left hand direction, latch 34 engages with rack 33 behind the last tooth on the right (Fig. 4) whereby the rack is slightly displaced to the left until shoulder 35 strikes against a fixed stop. The right hand end of rack 33 is hook shaped (Fig. 4) and overlaps lever 36 (Figs. 2, 4) the free end of which bears against latch 10.

When slide 18 is caught in its utmost position on the right of rack 33 the totalizer wheels 4 mesh with the reversing wheels 3. In this position the shifting mechanism has a subtracting effect (Fig. 9) by subtracting the divisor in a known way, as shown for instance in the aforesaid British patent, once more from the dividend places corresponding to it than it is contained therein. This results in the last number wheel 5 (Fig. 9) being set from "0" to "9". Cam 37 then strikes against the roof shaped end of latch 34 (Fig. 7) which consequently comes out of engagement with rack 33. Immediately afterwards latch 34 is caught by the following tooth of said rack so that the slide now assumes an adding position. In this position the latch 34 pulls rack 33 against the spring 9 acting upon levers 10, 36 which close contact 17 in order to provide for correction by adding the divisor subtracted once in excess whereby the last number wheel is set back from "9" to "0". At the same time cam 37 again releases the latch 34.

For the purpose set forth above the rack 33 is provided with twice as many teeth as the rack 20. While the latter has one tooth for each space or digit, rack 33 has one intermediate tooth between each two teeth corresponding to the spaces mentioned, according to the design of the shifting mechanism which acts upon the number wheels 4, 5 partly directly, partly indirectly, by means of the main wheels 2 and the reversing wheels 3 respectively.

Every time latch 34 is disengaged from rack 33 the latter is drawn to the right by spring 9 so that after each subtraction done in excess and after each correction the circuit is again interrupted at 17, 17' and groove wheel 6 stopped by latch 10. These functions are repeated until the latch 34 drops upon the shoulder 35 of the rack 33 and accordingly no longer develops a pull toward the left on the rack 33. Consequently the rack 33, by the action of the spring 9 (Fig. 4) and through the medium of the levers 10 and 36, is drawn back toward the right, whereby the contacts 17, 17' are disengaged, and the lever 10 is adjusted into the recess 8 of the ring 7. The machine now stops and the division calculation is ended.

I claim:

1. In a motor driven computing machine having a shiftable lock mechanism and a simultaneously operated contact, shifting means for starting a motor and a totalizer; means for shifting the totalizer into another decade in one position of the contact shifting device and for starting the motor in the other position of the said shifting device.

2. A computing machine of the character set forth in claim 1, in which the locking is effected after each complete revolution by the engagement of a member of said lock mechanism with a roller at an elongated recess of such roller, and means are associated with said parts for interrupting the circuit prior to the completion of a revolution to protect such member against shocks.

3. A computing machine of the character set forth in claim 1, provided with two locking members, one effective during addition, subtraction, and multiplication, and the other during division, in combination with a releasing bar, a rack, and a controlling member adapted to be set to different arithmetical positions, said controlling member when shifted to the division position actuating said releasing bar to render the addition, subtraction and multiplication locking member ineffective, and coincidentally shifting said rack into the path of the division locking member for sole co-operation therewith for division computations.

4. In a motor driven computing machine having a shiftable lock mechanism and a simultaneously operated contact, shifting means for starting a motor and a totalizer; a rocking member for operating said shifting device; means for shifting the totalizer into another decade as said rocking member is moved to bring the contact shifting device into one of its positions, and for starting the motor in the other position of said rocking member and contact shifting device.

5. A computing machine of the type set forth in claim 4, in which the lock mechanism comprises a lever operatively connected with the rocking member and adapted to act both as a locking member and as a switch-operating member.

6. In a motor driven computing machine having a shiftable lock mechanism and a simultaneously operated contact, a totalizer, shifting means for releasing said shiftable lock mechanism and for concurrently adjusting said contact to start a motor, additional shifting means for shifting the totalizer into another decade, a rocking lever provided with a pair of keys for independently operating said two shifting means to start the motor or to shift the totalizer, said totalizer being alternately stopped in its subtracting and adding positions, and means whereby said contact is automatically operated to close its circuit when said totalizer is adjusted to another operative position for division.

In testimony whereof I have affixed my signature.

CHRISTEL HAMANN.